United States Patent [19]
Atkinson

[11] Patent Number: 5,291,790
[45] Date of Patent: Mar. 8, 1994

[54] COUNTER ASSEMBLY FOR GAS METER

[75] Inventor: Albert B. Atkinson, Houston, Tex.

[73] Assignee: Dresser Industries, Inc., Dallas, Tex.

[21] Appl. No.: 14,195

[22] Filed: Feb. 5, 1993

[51] Int. Cl.$^5$ .............................................. G01F 15/02
[52] U.S. Cl. ..................... 73/861.01; 73/233
[58] Field of Search ........................ 73/861.01, 233

[56] References Cited

U.S. PATENT DOCUMENTS

| | | |
|---|---|---|
| 3,580,073 | 5/1971 | Siebold .................................. 73/233 |
| 3,581,566 | 6/1971 | Goff et al. . |
| 3,969,939 | 7/1976 | Ignacy . |

*Primary Examiner*—Richard E. 30ilcot, Jr.
*Assistant Examiner*—Marshad Patel

[57] ABSTRACT

A mechanical computer for a compensated meter counter assembly for a gas meter includes a one-way clutch with an input hub drivingly releasable and connectable to an output shaft for driving a register. A computer arm carried by the input hub oscillates along a specified arc about the axis of the hub between an initial position and a travel limiting cam surface positioned in response to temperature changes. An adjustably settable connection is provided between the arm and the hub for selectively pivoting said arm about said hub to position the outer end of the arm in a selectively set angular position relative to said hub and along the arc. In this position the outer end of the arm is held so as to precisely register with the initial position of the arc at the start of each oscillation.

9 Claims, 2 Drawing Sheets

COUNTER ASSEMBLY FOR GAS METER

BACKGROUND OF THE INVENTION

1. Technical Field

This invention relates to a counter assembly for use in conjunction with a fluid meter to provide flow volume information corrected to a standard. In particular, the invention is concerned with an improvement in a mechanical computer arrangement contained within the counter assembly to provide for the correction of a measure of actual flow.

2. Background Information

Typically, meters used to measure the flow of gases, such as natural gas, measure in quantities of cubic feet. With natural gas being sold on a cubic foot basis it is important both from the supplier's standpoint and the consumer's standpoint that the heating value of each cubic foot purchased be constant. However, the heating value of a cubic foot of natural gas changes dependent upon both temperature and pressure. As a result, measured quantities of gas are corrected to standard cubic feet. A standard cubic foot is representative of that amount of gas which occupies a cubic foot of space at a standard temperature and pressure. Under normal service conditions, changes in the temperature of the gas are more dramatic and likely to have a much greater effect upon the correction to standard than are the changes in the pressure of the gas.

To provide for corrections due to temperature, gas meters include counters with mechanical computers which correct measured volumes of gas flow to standard. Generally, the way in which this is done is to convert the constant directional rotational motion of the meter rotors into oscillating arcuate motion and then to change the length of the arc based upon the difference in temperature from standard. A more detailed description of one form of counter employing the foregoing principle is described in U.S. Pat. No. 3,581,566.

Another arrangement utilizing the foregoing principle is disclosed in U.S. Pat. No. 3,969,939. As disclosed in this latter patent, the rotational motion of the output of the constant displacement rotors of the meter is converted by means of a crank wheel and lever link into an oscillating arcuate motion of a radial arm. An outer end of the arm, thus swings along an arcuate path. Positioned within the path is a cam surface whose location controls the length of the arc through which the end of the arm swings. The location of the cam surface within the path changes dependent upon temperature. The arm itself is attached to the input hub of a one way clutch so that, when the end of the arm swings from a start position most distant from the cam surface toward the cam surface no motion is transmitted through the hub to an output shaft connected to a register. However, when the arm swings away from the cam surface, back toward its start position the input hub couples with the output shaft so the two rotate together. The amount of rotation of the output shaft represents a gas flow volume through the meter corrected for temperature. When further movement of the link is halted by the outer end of the arm engaging the cam surface, a lost motion spring connection between the crank wheel and the link allows the crank to slide within the link.

At standard temperature, the distance travelled by the outer end of the arm is a standard length measured from its initial position most distant from the cam surface to the standard temperature point on the cam surface. As the temperature of the gas flowing through the meter changes either up or down from standard, a corresponding change occurs in the location of the cam surface intersecting the path of the arc of travel of the arm. At the cam end of the arc, the length is either increased or decreased. At the start of each oscillation, the computer arm is returned to the same initial end position of the arc. If when starting each oscillation, the outer end of the computer arm is not in registry with the initial position of the arc, an erroneous measure of gas volume will be obtained because the length travelled by the arm will be incorrect for the cam surface temperature setting which intersects the arc. The ability to adjust the position of this starting point is therefore important to the accuracy of the meter.

In the meter disclosed in U.S. Pat. No. 3,969,939, adjustment of the initial end position of the arc of travel for the outer end of the radial arm is achieved by using a set screw to change the end position of the slot in the link. Adjustment of the set screw requires interruption in the operation of the meter owing to the virtually continuous motion of the link which carries the set screw.

In U.S. Pat. No. 3,581,566, adjustment of the start end position of the arc travelled by the computer arm is achieved by adjustment of the set screw carried on the driven arm and engaged by a portion of a driving arm. In this arrangement, the latter is oscillated about an idler bearing by reciprocation of a connecting rod to a crank driven through a gear train connected with the meter rotors.

SUMMARY OF THE INVENTION

The primary aim of the present invention is to provide a unique fluid meter counter assembly in which the components of the mechanical computer for adjustment of the start position of the computer arm are of simpler construction and easier to use in precisely adjusting the arm relative to the standard setting. In particular, the construction of the computer includes a unique connection between the computer arm and the input hub for adjustably securing the computer arm in a selectively set angular position relative to the input hub. Advantageously, by providing an adjustable mounting arrangement between the input hub and the computer arm, the oscillation start position for the computer arm may be factory adjusted to register precisely with the initial position of the arc during operation of the meter without having to include in the computer a separate driving component between the computer arm and the drive link.

The foregoing and other advantages of the present invention will become more apparent from the following description of the preferred embodiment when taken in conjunction with the accompanying drawings.

BEST MODE FOR CARRYING OUT THE INVENTION

Figure 1:
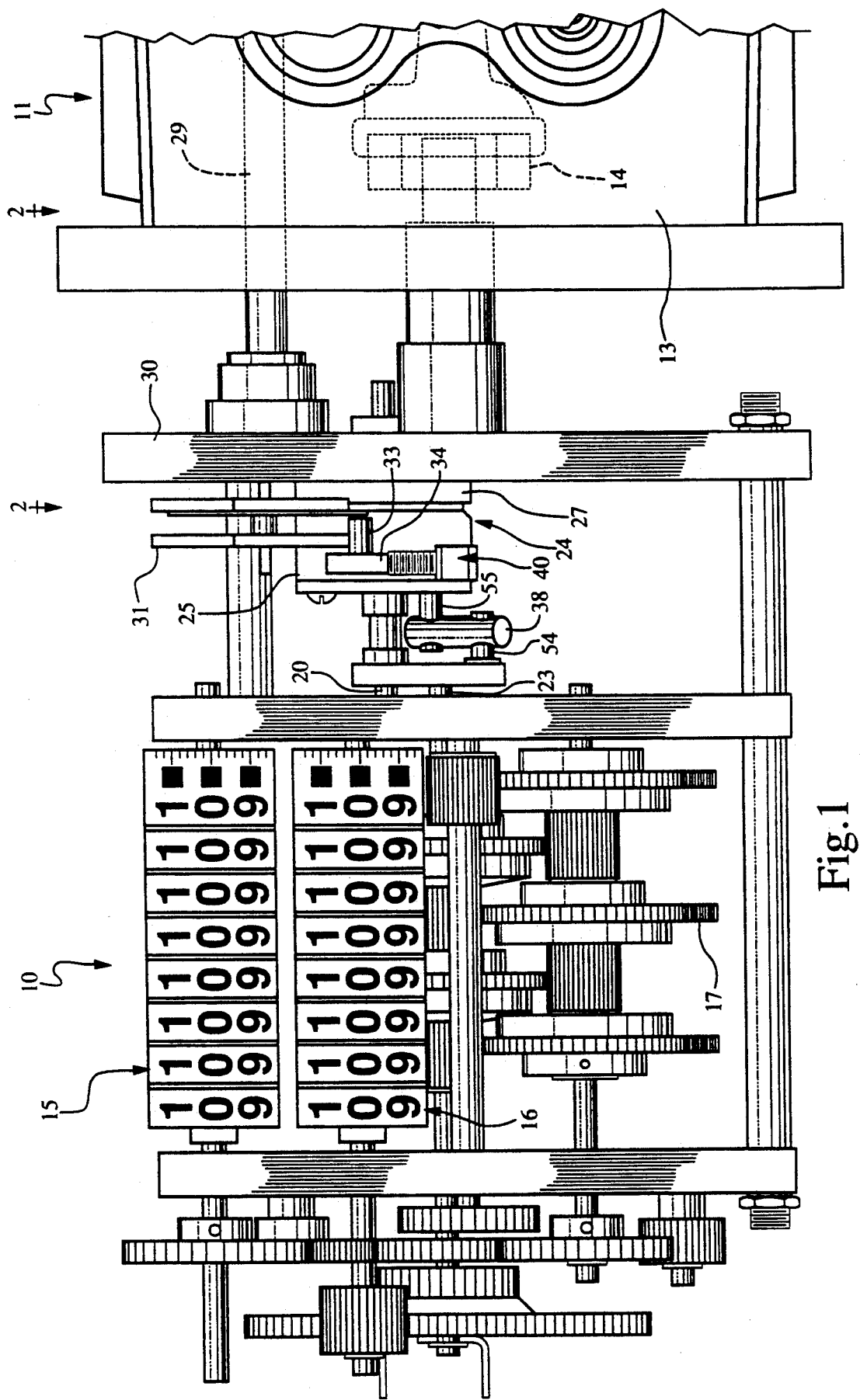
FIG. 1 is a plan view of the internal parts of a meter counter incorporating the novel features of the present invention.

As shown in the drawings for purposes of illustration, the present invention is embodied in a counter assembly 10 such as may be used in conjunction with a gas meter 11 to adjust the measurement of the actual volume of gas flowing through the meter to a standard volume measurement corrected to standard conditions, i.e. temperature and pressure. Connection to the meter 11 is shown generally in FIG. 1 with the counter assembly 10 attached to an end cover 13. Within the meter, two multi-lobe, fixed-displacement rotors (not shown) are rotated in opposite directions as gas flows through. The rotation of mating lobes of the rotors measures the actual volume of gas flowing through the meter. The counter assembly counts the number of rotations of the rotors and thereby provides a measurement of the amount of gas flowing through the meter.

Drive connection of the meter 11 to the counter assembly 10 is provided by a magnetic coupling 14 which connects an output shaft (not shown) of the meter to an input shaft (not shown) of the counter 10. Within the exemplary counter are two registers 15 and 16 driven by a gear train 17 connected to the input shaft. The register 15 provides an uncorrected reading of the actual volume of gas which has passed through the meter while the register 16 provides a reading corrected to a standard temperature volume.

Figure 2:
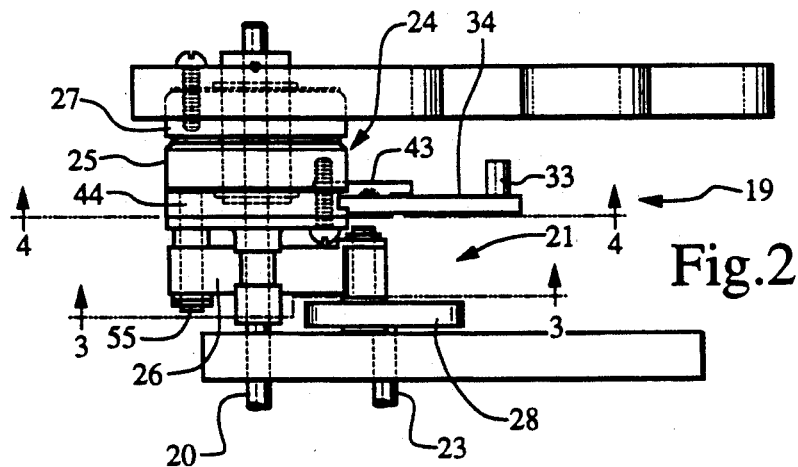
FIG. 2 is an elevational view of a portion the counter taken substantially along the line 2—2 in FIG. 1.
Figure 3:
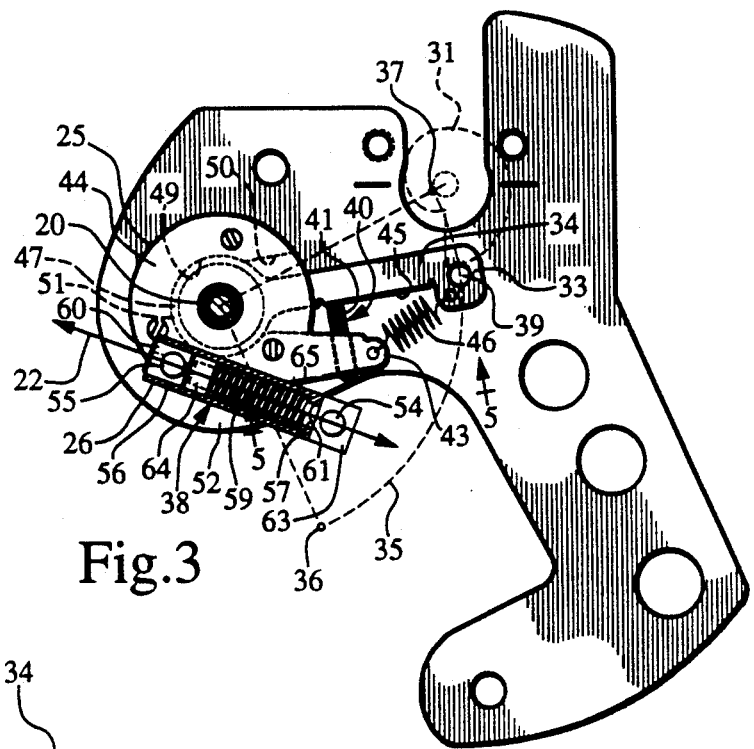
FIG. 3 is an enlarged view taken substantially along the line 3—3 shown in FIG. 2.
Figure 4:
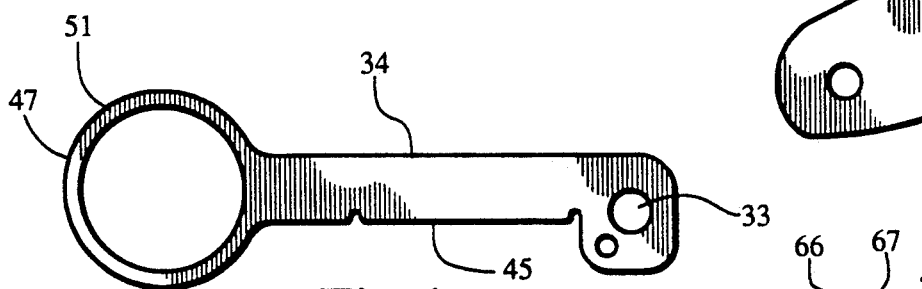
FIG. 4 is an enlarged view taken substantially along line 4—4 of FIG. 2 but with parts removed for clarity of illustration.

To correct for variations in gas volume due to temperature, the counter assembly 10 includes a computer mechanism 19 (see FIG. 2) operable to adjust the measured volume rotation of the input shaft to a standard volume rotation of an output shaft 20 which drives the register 16. More specifically herein, this is achieved through a four-bar linkage system 21 connected between a computer input shaft 23 driven by the gear train 17 and the computer output shaft 20. A one-way clutch unit 24 on the output shaft 20 is oscillated counterclockwise and clockwise by the linkage system. As shown in FIGS. 2 and 3, an input hub 25 of the clutch is connected to a link 26 in the linkage system and is reciprocated in the direction indicated by the double-ended arrow 22 (see FIG. 3) by means of a crank 28 (FIG. 2). When the link 26 moves generally toward the right as viewed in FIG. 3, the input hub is drivingly rotated on the output shaft 20. As this occurs, a rear hub 27 (FIG. 2) of the clutch holds the output shaft 20 against rotation. However, when the link advances generally to the left (see FIG. 3), the input hub 25 grips the output shaft 20 driving it in a clockwise direction.

Adjustment for temperature is achieved by limiting the amount of rotation of the input hub 25 from its starting position in response to a sensed temperature. For this purpose, a bimetal-probe 29 (see FIG. 1) is mounted on a support plate 30 adjacent the clutch unit 24 and is attached to a cam 31 which functions as a condition responsive stop to limit counterclockwise travel of an outer end 33 of a computer arm 34 connected to the clutch input hub. The temperature sensed by the probe determines position of the cam and hence the travel of the computer arm along an arcuate path 35 from its initial position 36 indicated on FIG. 3. The temperature, of course, is variable dependent upon the temperature of the gas flowing through the meter. The cam thus serves to limit travel of the arm at a cam end 37 of the arc 35 and, in turn, any further counterclockwise rotation of the input hub when the arm abuts a temperature spot 39 on the cam. In traveling in a counterclockwise direction, after the computer arm 34 engages the cam 31, an overtravel spring-biased connection 38 within the linkage system provides for relative differences in travel between the corrected rotational output of the counter 10 and the uncorrected rotational input from the meter 11. When the input hub 25 is rotated in a clockwise direction away from engagement with the temperature spot 39 on the cam by the four-bar linkage system, the input hub grips the output shaft 20 causing the latter to rotate through the same degree of arc which is traveled by the computer arm in returning to is starting position 36. This arcuate travel represents a direct proportional conversion to a standard volume measurement of the volume of gas flowing through the meter during one revolution of the crank 28.

More particularly, the overtravel spring connection 38 is in the link 26 and comprises a resiliently elongatable intermediate section 52 with opposite ends secured pivotally yet eccentrically by means of pins 54 and 55 to the crank 28 and input hub 25, respectively. The intermediate section 52 acts to urge the opposite ends toward each other so that link remains at its minimal length except when the computer arm 34 engages the temperature cam 31. In the exemplary form of the invention, the link comprises a telescoping cylinder or sleeve 56 and rod 57 arrangement connected together by way of a spring 59. As shown in FIG. 3 at the input hub end of the sleeve, pin 55 protrudes from the side of the input hub and into an end plug 60 which is pressed into the sleeve. At the opposite end of the sleeve is a small hole 61 through which a crank end portion of the rod 57 extends and attached to the crank end portion of the rod is a generally cylindrical head 63 which is connected by the crank pin 54 to the crank 28. The rod is held in the sleeve by a capture ring 64 which is press fit onto its inner end. Urging the rod into the sleeve is the compression spring 59 which acts between the capture ring and an annular shoulder 65 formed around the hole 61.

During operation of the counter assembly 10 when the computer arm 34 first engages the temperature cam 31 the link 26 is moving to the right as is shown in FIG. 3. As the link continues to move to the right, engagement of the outer end 33 of the computer arm with the cam prevents the input hub from rotating further in a counterclockwise direction. This overcomes the compressive force of the spring 59 so that and the intermediate section of the link begins to lengthen with the spring being compressed. Then, when the link returns to the left and once the head end of the rod engages the end of the cylinder, the input hub grips the output shaft and the register is rotated by the shaft the distance that the arm moves back to the start position for the computer arm. Important to the accuracy of the counter assembly is that the start position of the computer arm be accurately positioned initially to eliminate, for example, tolerance errors in the assembly of the components.

In carrying out the present invention, a unique adjustably settable connection is provided between the computer arm 34 and the input hub 25 enabling quick and easy adjustment of the length of the arc 35 traveled by the outer end 33 of computer arm to eliminate mechanical errors which otherwise would affect the accuracy of the measurement correction to the standard. For this purpose, the connection includes a mechanism 40 (see FIG. 3) which is carried by the input hub and is adjustable to set and hold the computer arm in a selected angular position relative to the input hub. As a result, the outer 33 of the arm may be made to align precisely with the initial end position 36 of the arc so that the arm always returns to the same position for the start of each oscillation. Advantageously, the adjustment in the position of the outer end occurs along the arc and may be accomplished while the arm dwells on the cam. Thus, adjustment may be made even during operation of the meter.

In the present instance, the connection for mounting the computer arm 34 onto the input hub 25 includes adjustable screw stop 41 secured within a threaded hole 42 to a generally tangentially extending leg 43 (see FIG. 3) of a face plate 44 attached to the input hub. The stop 41 abuts an undersurface 45 of the computer arm 34 radially inwardly of the outer end 33 thereof to provide selected angular positioning of the computer arm on the plate. A spring 46 connecting between the ends of the arm and leg urges the two together so that the computer arm and input hub function as a unitary member. At an inner end 47 of the computer arm, a socket 49 (see FIG. 3) is formed in the plate and includes an angular notch 50 extending generally radially outward from the center of the plate. An inner ring-shaped end 51 of the computer arm is nested in the socket with the arm extending generally radially outward through the notch for angular adjustment relative to the plate by the adjustable screw stop 41. Angular adjustment is limited angularly by engagement with the sides of the notch.

Figure 5:
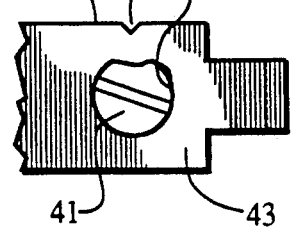
FIG. 5 is an enlarged fragmentary detailed view of a part of the counter taken substantially along line 5—5 of FIG. 3.

In making a factory adjustment of the position of the computer arm 34 on the input hub 25, the gear train 17 is driven to turn the crank 28 so as to shift the link 26 into its furthermost position to the left (see FIG. 3). This theoretically positions the computer arm in registry with the true starting position 36 of the arcuate path 35. In actuality, as a result of manufacturing tolerances or other mechanical errors, the outer end 33 of the computer arm may not register precisely with the true starting position of the path. As the gear train is driven, an adjustment in the position of the arm relative to the input hub (and registry with the start position of the path) is achieved while the arms dwells on the temperature cam 31, by turning the screw 41 in an appropriate direction so that upon return of the arm to its furthermost position from the temperature cam, the outer end of the arm is in registry with the start position of the arcuate path. As an aid to adjustment and to eliminate the need for a separate locking device, the inside 66 (see FIG. 5) of the leg 43 adjacent the threaded hole 42 is deformed as indicated by the dent 67 shown in FIG. 5 to secure the screw so as to hold the computer arm into its adjusted initial position.

In view of the foregoing, it will be appreciated that the present invention brings to the art an improved arrangement for providing mechanical adjustment in the start position of the computer arm 33 of the mechanical computer 19 of the meter counter assembly 10 through the use of the novel connection 40 for adjustable mounting of the computer arm on the input hub 25.

I claim:

1. In a mechanical computer for a compensated meter counter assembly for a gas meter wherein the computer includes a one-way clutch having an input hub drivingly releasable and connectable to an output shaft to drive a register, and a computer arm carried by said input hub for an outer end thereof to oscillate along a specified arc about the axis of the hub between an initial position and a travel limiting cam surface positioned in response to changes in the condition of the gas being measured relative to a standard, the improvement comprising, an adjustably settable connection between said arm and said hub for pivoting said arm about said hub to position said outer end in a selectively set angular position relative to said hub and along said arc, and means for holding said outer end in said selectively set position for precisely locating said outer end to register with said initial position of said arc at the start of each oscillation.

2. In a gas meter having a gear train with a rotor-powered shaft connected to a compensated meter counter including a mechanical computer assembly with a one-way clutch drivingly connectable with an output shaft for unidirectional rotation of said output shaft to drive a register connected thereto and wherein said clutch includes an input hub carrying a computer arm which oscillates with said hub along a specified arc between an initial position and a travel limiting cam surface the improvement comprising, adjustable means for securing said computer arm on said input hub into a selectively set angular position relative thereto, said adjustable means including, an adjustably positionable stop surface on one of said arm and said hub, and a spring acting between said arm and said hub to urge together said stop surface and the other one of said arm and said hub, whereby said arm is held in said set angular position relative to said input hub to register with said initial position at the start of each oscillation.

3. A counter assembly for a fluid meter having an output shaft rotatable proportionally to the volume of fluid flow through the meter, said counter assembly including
  a support plate, an input crank shaft supported adjacent said plate and drivingly connectable with said output shaft, a computer mechanism connected to said plate, and a readable register driven by said computer mechanism to provide corrected fluid flow volume information,
  said computer mechanism having a clutch shaft connected to said register and rotated about a longitudinal axis proportionally to the corrected volume flow of fluid through said meter, a one-way clutch unit including an input hub mounted rotatably on said clutch shaft to drivingly release from and connect with said clutch shaft for unidirectional rotation thereof, a crank connected to said crank shaft, a drive link with one end pivotally connected to said crank and an opposite end coupled to said input hub and being reciprocally movable in response to rotation of said crank to oscillate said input hub about said axis, a computer arm secured to and carried by said input hub for movement in unison therewith and having an outer end which with reciprocal movement of said link oscillates about said axis through an arc of travel delimited in length relative to a standard length between an adjusted initial position and a corrected end position, an adjustment mechanism connected to said computer arm for adjustment of said outer end angularly relative to said axis into a set angular position relative to said input hub to register precisely relative to said initial position at the start of each oscillation, a condition responsive stop positionable in the arc of travel of said computer arm to locate said corrected end position in response to changes relative to a preselected standard condition and thereby delimit the arc of travel of said arm relative to said standard length arc, and an overtravel spring-biased connection between said computer arm and said crank to accommodate relative movement therebetween when said outer end engages said stop.

4. An assembly as defined by claim 3 wherein said adjustment mechanism includes an adjustable screw stop connected to said input hub and having a free end engagable with said computer arm for angular adjustment of said arm relative to said input hub, and a spring connected between said computer arm and said input hub and urging said computer arm against said free end.

5. An assembly as defined by claim 4 wherein said arm includes a ring-shaped inner end, said input hub having a socket formed therein and receiving said inner end of said arm for pivotal adjustment of said arm relative to said input hub.

6. An assembly as defined by claim 5 including a threaded hole formed in said input hub and receiving said stop screw, said threaded hole having a locking threaded section formed therein.

7. An assembly as defined by claim 3 wherein said link comprises an assemblage of components elongatable from a selected minimum length to a overtravel length when said arm is in engagement with said cam.

8. An assembly as defined by claim 7 wherein said assemblage includes a spring urging said link to said selected minimum length.

9. An assembly as defined by claim 8 wherein said assemblage comprises a rod and a cylinder telescoped together, said rod having a first end attached pivotally to one of said crank or said input hub and a second end thereof received within said cylinder, said cylinder having a first end portion thereof receiving said second end of said rod and a second end portion pivotally attached to the other of said crank and said input hub, said spring being a compression spring captured within said cylinder and acting between said first end thereof and said second end of said rod to urge said rod into said cylinder toward a minimum overall length of said assembly, said spring being compressed by movement of said rod when said assemblage is elongated.

* * * * *